(12) United States Patent
Shin

(10) Patent No.: US 9,134,732 B2
(45) Date of Patent: Sep. 15, 2015

(54) APPARATUS AND METHOD FOR CONTROLLING DRIVING OF VEHICLE

(71) Applicant: Hyundai Motor Company, Seoul (KR)

(72) Inventor: Ki Cheol Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/065,863

(22) Filed: Oct. 29, 2013

(65) Prior Publication Data

US 2015/0019064 A1    Jan. 15, 2015

(30) Foreign Application Priority Data

Jul. 9, 2013    (KR) .................. 10-2013-0080460

(51) Int. Cl.
 *G05D 1/02*    (2006.01)
(52) U.S. Cl.
 CPC .................. *G05D 1/0212* (2013.01)
(58) Field of Classification Search
 CPC .................................................. G05D 1/0212
 USPC .............................. 701/25, 26, 301
 See application file for complete search history.

(56) References Cited

U.S. PATENT DOCUMENTS

2002/0183906 A1* 12/2002 Ikeda .............................. 701/36
2012/0277957 A1* 11/2012 Inoue et al. ..................... 701/41

FOREIGN PATENT DOCUMENTS

| JP | H11-115660 A | 4/1999 |
| JP | 2008143263 A | 6/2008 |
| JP | 2011-170843 A | 9/2011 |
| JP | 2012-071833 A | 4/2012 |
| JP | 2013037601 A | 2/2013 |
| KR | 10-1998-047789 | 9/1998 |
| KR | 10-2001-0077768 A | 8/2001 |
| KR | 10-2012-0036440 | 4/2012 |

* cited by examiner

*Primary Examiner* — Mary Cheung
*Assistant Examiner* — Brian P Sweeney
(74) *Attorney, Agent, or Firm* — Mintz Levin Cohn Ferris Glovsky and Popeo, P.C.; Peter F. Corless

(57) ABSTRACT

An apparatus and a method for controlling driving of a vehicle are provided and the apparatus includes a sensor unit that has at least one sensor disposed at sides of a vehicle. In addition, a controller uses sensing information received from the sensor unit to confirm whether the vehicle enters a path and detects obstacles located in the path. The controller calculates a left and right width of the path based on the obstacles and then confirms whether the path is a narrow road. Further, the controller is configured to output a driving guidance to the confirmed narrow road.

11 Claims, 9 Drawing Sheets

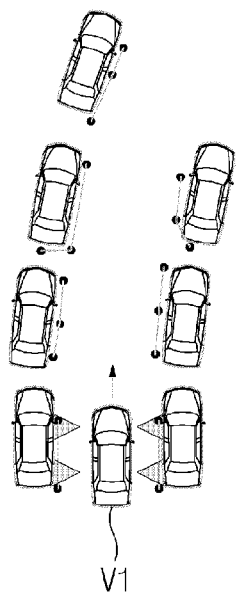 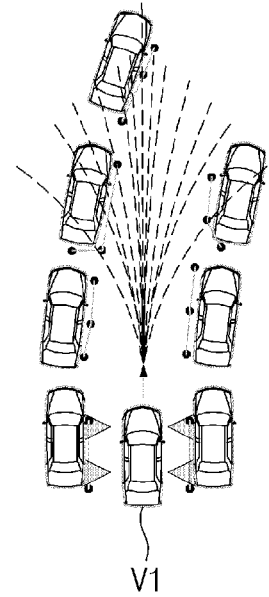 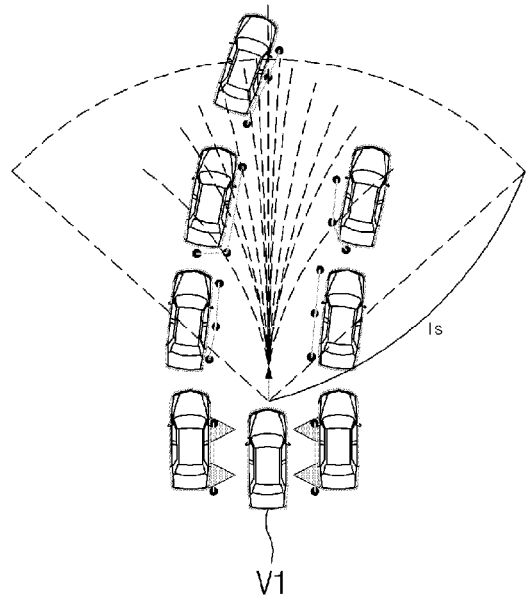
Fig.3A    Fig.3B    Fig.3C
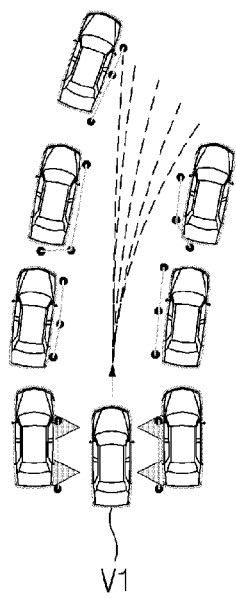 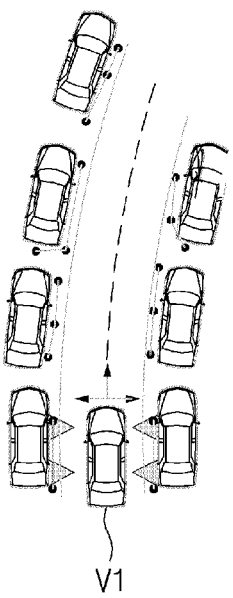 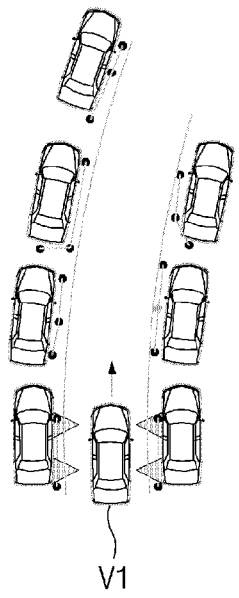
Fig.3D    Fig.3E    Fig.3F

APPARATUS AND METHOD FOR CONTROLLING DRIVING OF VEHICLE

CROSS-REFERENCE TO RELATED APPLICATION

This application is based on and claims priority from Korean Patent Application No. 10-2013-0080460, filed on Jul. 9, 2013 in the Korean Intellectual Property Office, the disclosure of which is incorporated herein in its entirety by reference.

BACKGROUND

1. Field of the Invention

The present invention relates to an apparatus and a method for controlling driving of a vehicle, and more particularly, to an apparatus and a method for controlling driving of a vehicle to allow a vehicle to safely pass through a narrow road by recognizing straight or curved narrow road conditions and calculating a width of a front of a vehicle or a width of a narrow road into which a vehicle enters.

2. Description of the Prior Art

In general, when a vehicle is driven on a narrow road, a side mirror of a vehicle or a mirror mounted within a vehicle are used to drive a vehicle by allowing a driver to directly identify situations extraneous to the vehicle. However, since a blind spot area of a front or a rear of a vehicle which may not be identified with the side mirror or the other vehicle mirrors in a narrow road, damage to a vehicle, or the like, may occur. Further, in an alley that has a narrow parking space, such as a residential area, a road may unexpectedly narrow and thus it may be difficult for a driver to drive a vehicle due to the unexpected occurrence of a road narrowing.

SUMMARY

Accordingly, the present invention provides an apparatus and a method for controlling driving of a vehicle to allow a vehicle to safely pass through a narrow road by recognizing straight or curved narrow road conditions and calculating a width of a front of a vehicle or a width of a narrow road into which a vehicle enters.

In one aspect of the present invention, an apparatus for controlling driving of a vehicle may include: a sensor unit that includes at least one sensor disposed at the sides of a vehicle; a controller that uses the sensor information received from the sensor unit to confirm whether the vehicle is entering a path and detects obstacles located on the path, calculates a left and right width of the path based on the obstacles and then confirms whether the path is a narrow road; and an output unit, operated by the controller, that outputs a driving guidance to the confirmed narrow road.

The controller may be configured to generate a plurality of arcs based on a rear wheel shaft of the vehicle based on a current velocity of the vehicle when the vehicle enters the path. The controller may be configured to calculate a safety distance based on a current velocity and a deceleration of the vehicle and extract the arcs and arcs which do not contact the obstacles within the safety distance to set the arcs to candidate group arcs. In addition, the controller may be configured to generate offset arcs that have minimum and maximum radii contacting the obstacles based on the candidate group arcs. The controller may be configured to calculate a width of the path based on a difference between the offset arcs that have the minimum and maximum radii to confirm whether the path is the narrow road.

In another aspect of the present invention, a method for controlling driving of a vehicle may include: analyzing, by a controller, sensing information measured by at least one sensor disposed at a side of a vehicle; confirming, by the controller, whether the vehicle enters a path, based on the analysis result; detecting, by the controller, obstacles located on the path; calculating, by the controller, a left and right width of the path based on the obstacles to confirm whether the path is a narrow road; and outputting, by the controller, a driving guidance to the confirmed narrow road.

The method for controlling driving of a vehicle may further include: after confirming whether the vehicle enters the path, measuring, by the controller, a current velocity of the vehicle when the vehicle enters the path; generating, by the controller, a plurality of arcs based on a rear wheel shaft of the vehicle based on the current velocity of the vehicle; and calculating, by the controller, a safety distance based on the current velocity and a deceleration.

In addition, the method for controlling driving of a vehicle may further include: after the detecting of the obstacles, extracting, by the controller, the arcs and arcs which do not contact the obstacles to set the arcs to candidate group arcs within the safety distance; and generating by the controller, offset arcs that have minimum and maximum radii contacting the obstacles based on the candidate group arcs. In confirming whether the path is the narrow road, a width of the path may be calculated based on a difference between the offset arcs that has the minimum and maximum radii to confirm whether the path is a narrow road.

BRIEF DESCRIPTION OF THE DRAWINGS

The above and other objects, features and advantages of the present invention will be more apparent from the following detailed description taken in conjunction with the accompanying drawings, in which:

FIGS. 2A-2D, 3A-3F, and 4 to 7 are exemplary diagrams describing a driving control of a vehicle according to the exemplary embodiment of the present invention;

DETAILED DESCRIPTION

Figure 1:
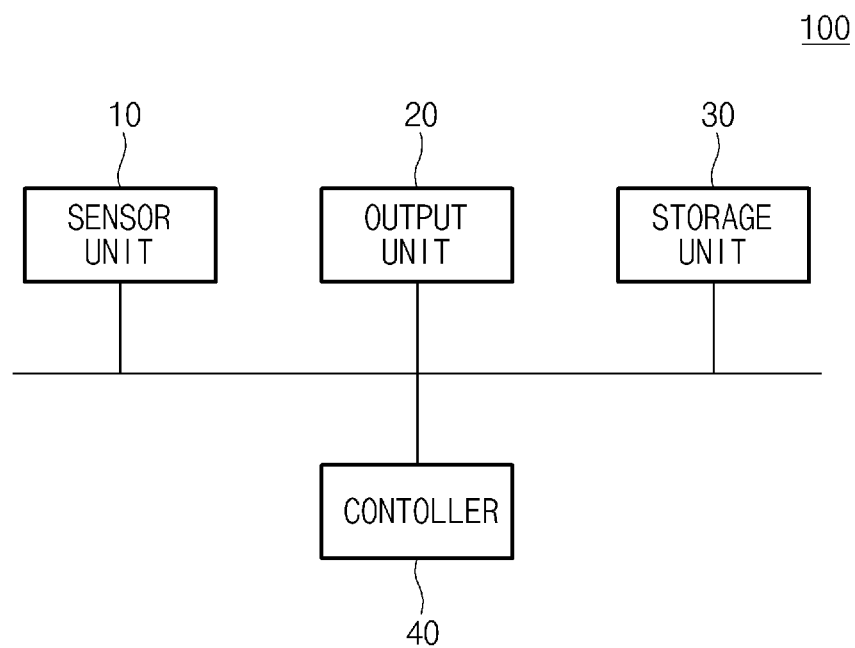
FIG. 1 is an exemplary block diagram illustrating main components of an apparatus for controlling driving of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in more detail with reference to the accompanying drawings. However, in describing embodiments of the present invention, technical descriptions which are well known and are not directly associated with the present invention will be omitted if possible. This is to more clearly deliver the gist of the present invention so as not to obscure the description of the present invention with unnecessary detail.

FIG. 1 is an exemplary block diagram illustrating main components of an apparatus for controlling driving of a vehicle according to an exemplary embodiment of the present invention. FIGS. 2 to 7 are exemplary diagrams describing a driving control of a vehicle according to the exemplary embodiment of the present invention. FIG. 8 is an exemplary screen exemplified diagram for describing the driving control of the vehicle according to the exemplary embodiment of the present invention.

Referring to FIGS. 1A to 8B, an apparatus 100 for controlling driving of a vehicle according to an exemplary embodiment of the present invention may include a sensor unit 10, an output unit 20, a storage unit 30, and a controller 40. The sensor unit 10 may include at least one sensor disposed at a side of a vehicle and may provide sensing information received from a sensor to a controller 40. In particular, the sensor unit 10 may include a laser radar which is light detection and ranging (LiDAR) and an ultrasonic sensor. Since the LiDAR sensor has a substantially high longitudinal and transversal recognition rate and minimal errors for adjacent obstacles, the LiDAR sensor may accurately recognize road conditions and the ultrasonic sensor may recognize conditions regarding the sides of a vehicle to confirm whether a current vehicle passes through the road. Further, a sensor mounted to a vehicle is not limited to the LiDAR sensor and the ultrasonic sensor and various sensors that correspond thereto may be used. Further, the sensor unit 10 may include a camera sensor to acquire image data of a front, a side, and a rear of a vehicle.

Figure 8A:
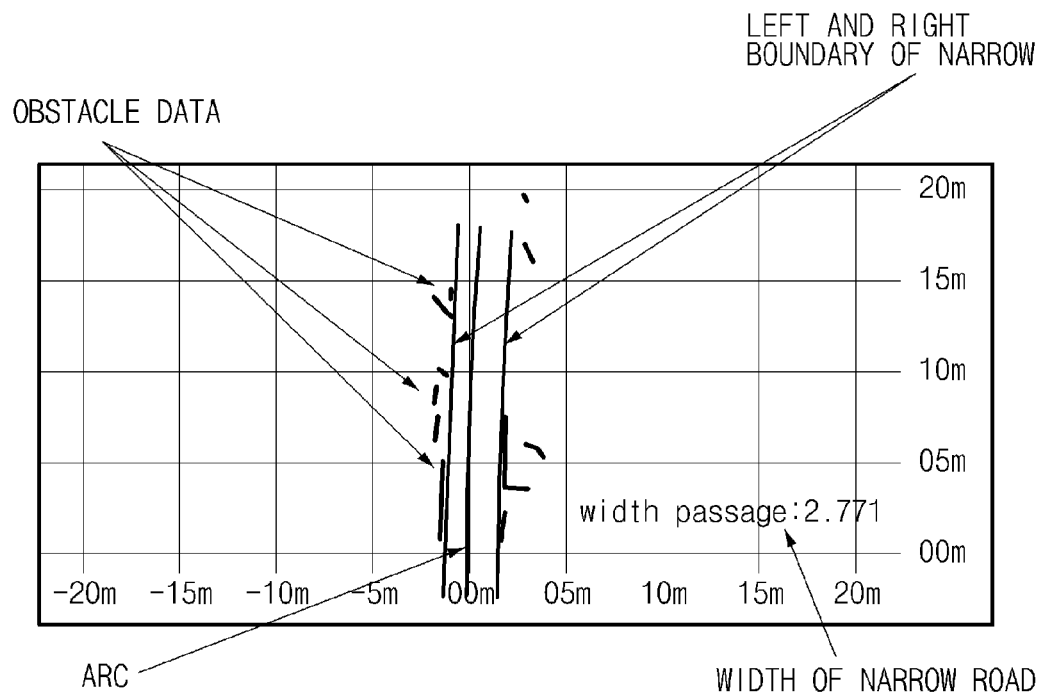
FIGS. 8A-8B is an exemplary diagram illustrating a screen for describing the driving control of the vehicle according to the exemplary embodiment of the present invention.
Figure 8B:
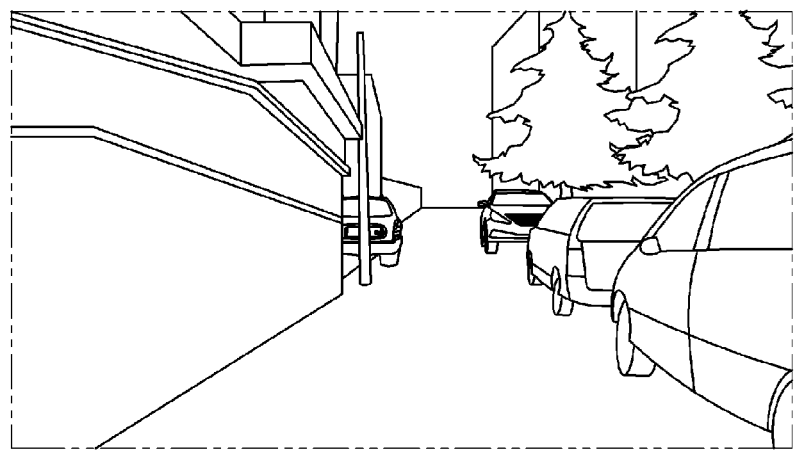

As illustrated in FIG. 8B, the output unit 20, executed by the controller 40, may be configured to output image data of a current position of the a vehicle and output message informing that a vehicle is entering a narrow road In particular, the output unit 20 may be configured to output messages regarding whether a path is a narrow road based on a left and right width of the path through which a vehicle proceeds and a width of a vehicle and output a driving guidance for safely passing through a vehicle. As a result, even when a driver enters a narrow road, it may be possible to secure safety of a vehicle when driving and reduce a burden of a driver when driving a vehicle on a narrow road.

Figure 2D:
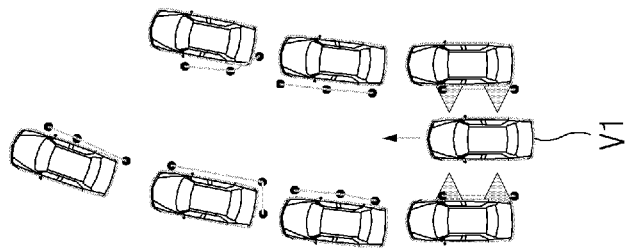
Figure 2C:
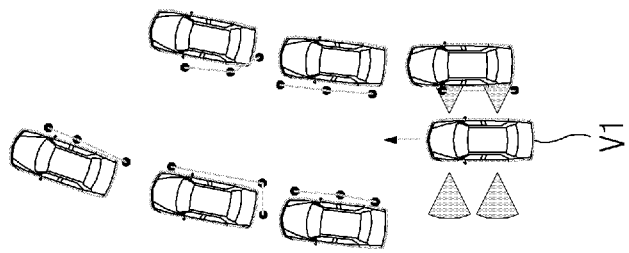
Figure 2B:
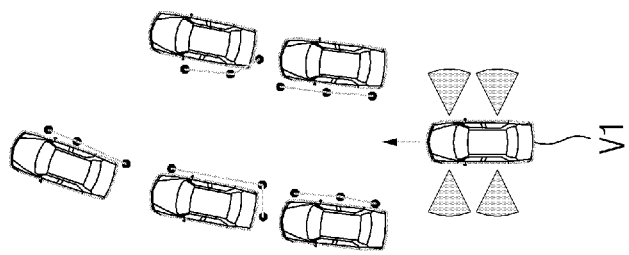
Figure 2A:
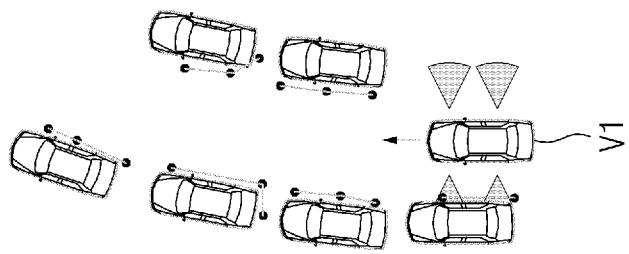

The controller 40 may be configured to store on the storage unit 30 image data of a path acquired by a camera sensor and programs for determining a path as a narrow road and store various programs for operating a driving control apparatus 100. In addition, the controller 40 may be configured to confirm whether a vehicle enters a path based on the sensing information received from the sensor unit 10, detect obstacles located within a path, and calculate a left and right width of a path based on obstacles to confirm whether a path is a narrow road. In particular, the controller 40 may be configured to confirm whether a vehicle enters a path based on the sensing information received from the sensor unit 10. For example, under the conditions as illustrated in FIGS. 2A to 2C, the controller 40 may be configured to confirm that another vehicle is not present at any side of the vehicle V1 based on an analysis result of the sensing information to confirm that the vehicle V1 does not enter a path. In other words, when the controller confirms that no other vehicle is present around vehicle V1, the controller may be configured to confirm that the vehicle V1 does not enter the path. Further, under the conditions illustrated in FIG. 2D, the controller 40 may be configured to confirm that another vehicle is present at the left and right side of the vehicle V1 to confirm that the vehicle V1 enters the path. Further, the controller 40 may be configured to detect obstacles located within a path in order of FIGS. 3A to 3F and confirm whether the path is a narrow path depending on a left and right width of a path, based on the obstacles.

Figure 4:
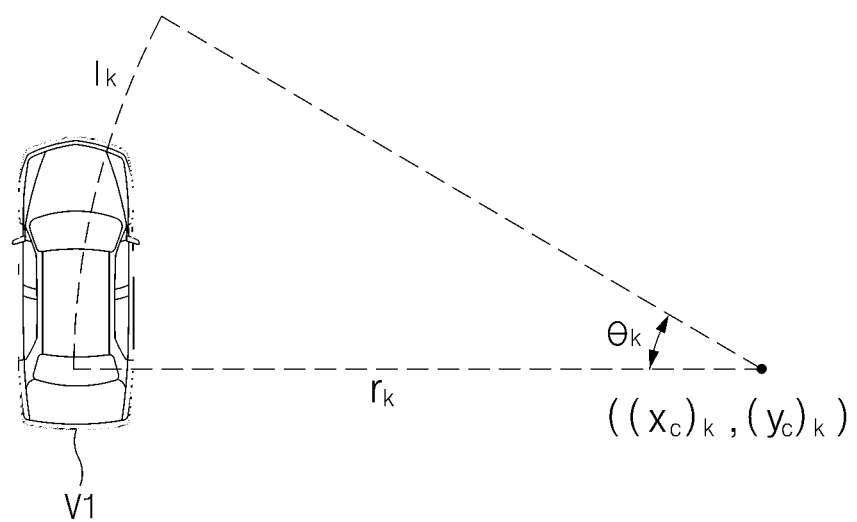

FIG. 3A illustrates the vehicle V1 entering a path. In addition, as illustrated in FIG. 4, the controller 40 may be configured to generate an arc by setting a rear wheel shaft of the vehicle V1 to 0°. In particular, all the generated arcs may be vertical to a tangent line between the rear wheel shaft and a starting point of an arc. The controller 40 may be configured to generate a plurality of arcs as illustrated in FIG. 4, and may be configured to generate a plurality of arcs left and right based on the vehicle V1 as illustrated in FIG. 3B. In particular, radii of each arc may be different and a central point of an arc may be determined by a radius of an arc. A length of an arc may be determined by the following Equation 1.

$$l_k = l_o + vT \qquad \text{Equation 1:}$$

wherein, $l_o$ represents a minimum length, T represents an arbitrarily determined consideration time, and v represents a current velocity A radius of the generated arc may be generated in consideration of a maximum radius which may move by the vehicle V1. The controller 40 which generates the plurality of arcs may be configured to calculate a safety distance 1 based on a deceleration α and a current velocity v which may control the vehicle V1, the consideration time T, and a margin length $l_m$.

The safety distance may be determined by the following Equation 2 and $l_s$ may be represented as illustrated in FIG. 3C.

$$l_s = l_m + vT + \frac{1}{2}aT^2 \qquad \text{Equation 2}$$

Figure 5:
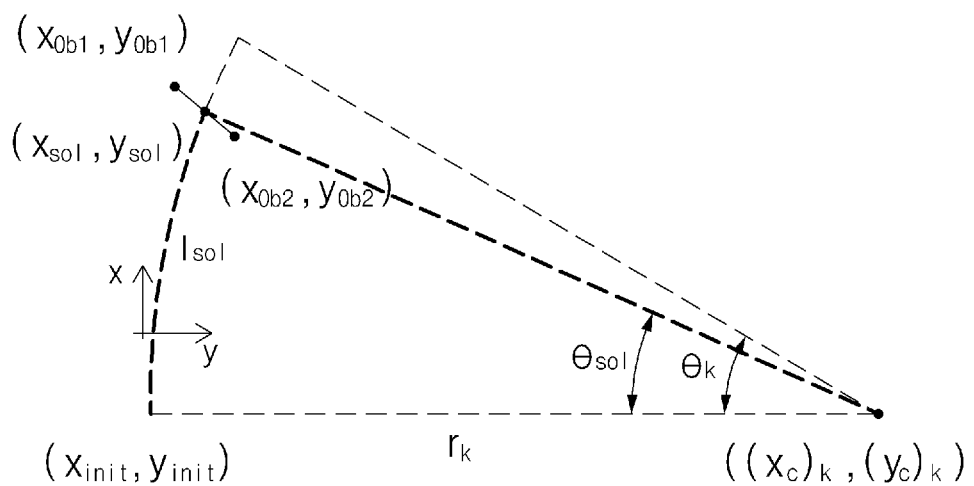

Next, the controller 40 may be configured to confirm locations of obstacles (e.g., other vehicles) which are present on a path to compare the plurality of generated arcs with locations of the obstacles, thereby confirming whether contacts ($x_{sol}$, $y_{sol}$) are present between the arcs ($l_{sol}$) and the obstacles (($x_{ob1}$,$y_{ob1}$), ($x_{ob2}$,$y_{ob2}$)). In particular, the locations of other vehicles may be confirmed based on information regarding the obstacles formed as a dashed line as illustrated in FIG. 5. The controller 40 may be configured to use the information regarding the obstacle formed dashed line to calculate contacts between the generated arcs. In particular, the controller 40 may be configured to use a circular equation and a straight line equation, which depends on the following Equations 3 and 4.

$$sy_{sol} = \left(\frac{y_{ob_2} - y_{ob_1}}{x_{ob_2} - x_{ob_1}}\right)x_{sol} + \left\{y_{ob_1} - \left(\frac{y_{ob_2} - y_{ob_1}}{x_{ob_2} - x_{ob_1}}\right)x_{ob_1}\right\} \qquad \text{Equation 3}$$

$$r_k^2 = (x_{sol} - x_c)_k^2 + (y_{sol} - y_c)_k^2 \qquad \text{Equation 4}$$

In this case, Equations 3 and 4 may satisfy conditions $x_{ob1} < x_{sol} < x_{ob2}$, $y_{ob1} < y_{sol} < y_{ob2}$, $0 < \theta_{sol} < \theta_k$. The controller 40 may be configured to set candidate group arcs as the remaining arcs, except for the arcs at which contacts between other vehicles and arcs are generated as illustrated in FIG. 3D. In particular, the controller 40 may be configured to use the candidate group arcs to confirm a curvature.

Furthermore, the controller 40 may be configured to generate an offset curve by selecting an optimal arc from the candidate group arcs. The controller 40 may be configured to generate the offset curve using an arc that has a radius larger and smaller than that of the arc selected by setting a point such as a central point of the selected arc to a central point. Further, the controller 40 may be configured to use the information regarding the obstacles when generating the offset curve.

Figure 6:
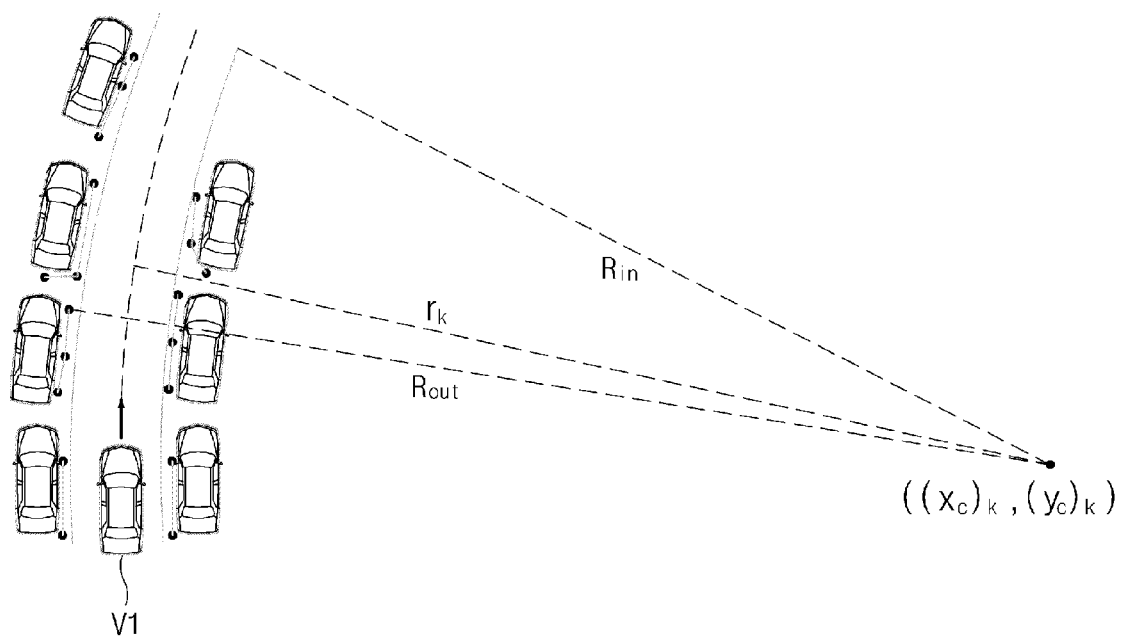
Figure 7:
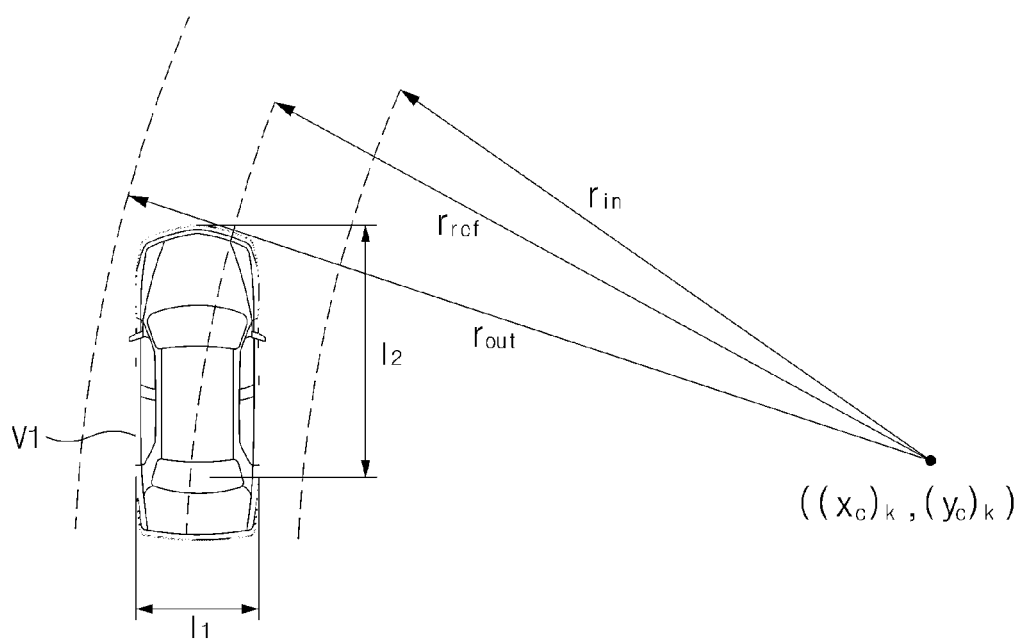

As illustrated in FIGS. 3E and 6, the controller 40 may be configured to generate the offset curve so that among the offset curves, a radius $R_{out}$ of a larger arc, that is, an outer arc is larger than a radius $r_k$ of an extracted arc but has the smallest radius which contacts obstacles. On the contrary, the controller 40 may be configured to generate the offset curve so that among the offset curves, a radius $R_{in}$ of a smaller arc, that is, an inner arc is smaller than an arc $r_k$ of the extracted arc but has the largest radius contacting obstacles. The controller 40 may not be configured to consider the path as a narrow road when the offset curves are not generated at the left and right sides or at any one of the left and right sides or a width of the path is sufficiently wide. Further, when the width of the path is equal to or less than the threshold value, the controller 40 may be configured to recognize the path as a narrow road to calculate the width of the narrow road.

Generally, when the vehicle V1 enters a path while turning, unlike when a vehicle travels substantially straight, a width of a wider path may be required. In particular, a width of a path minimally required for a steering angle of the vehicle V1 wheel is equal to a difference in a width between arcs generated by an inner rear wheel in a rotating direction of the vehicle V1 and a front corner of the vehicle at an outside in a rotating direction. In other words, referring to FIG. 7, when the vehicle V1 rotates at a predetermined steering angle in a normal state (e.g., toward a front of the vehicle), a minimum vehicle width $r_{out} - r_{in}$ required when the driving the vehicle may be calculated based on a geometrical relationship between a radius $R_{ref}$ drawn by a path predicted by a steering of the vehicle and a rectangular vehicle V1. This may depend on the following Equation 5 and Equation 6 wherein, $l_1$ represents a maximum width of the vehicle V1 which is a sum of a full width of the vehicle V1 and a rear view mirror and $l_2$ represents a sum of a wheel base and a front overhang.

$$r_{in} = r_{ref} - \frac{l_1}{2} \qquad \text{Equation 5}$$

$$r_{out} = \sqrt{\left(r_{ref} + \frac{l_1}{2}\right)^2 + (l_2)^2} \qquad \text{Equation 6}$$

In particular, even though the width of the path may be larger than the vehicle width $l_1$, the controller 40 may be configured to determine the path as a narrow road into which the vehicle V1 may not enter when the width of the path is less than that of the path required when the vehicle is turning and may be configured to determine the path as a path into which the vehicle V1 may enter when the width of the path is greater than that of the path. FIG. 8A illustrates a screen recognized as a narrow road by the above-mentioned operation. Obstacle data of FIG. 8A mean data that represents locations of obstacles, such as a building, an electric pole, other parked vehicles, and the like, as illustrated in FIG. 8B, a left and right boundary of a narrow road means the offset curve, and an arc means an arc which is a reference of the generation of the offset curve. Further, the width of the narrow road means the width of the narrow road which is calculated based on the offset curve. The controller 40 may be configured to output a narrow road calculated as illustrated in FIG. 3F to a driving guide output unit 20 which may pass through a narrow road. This may be illustrated in FIG. 8B.

Figure 9:
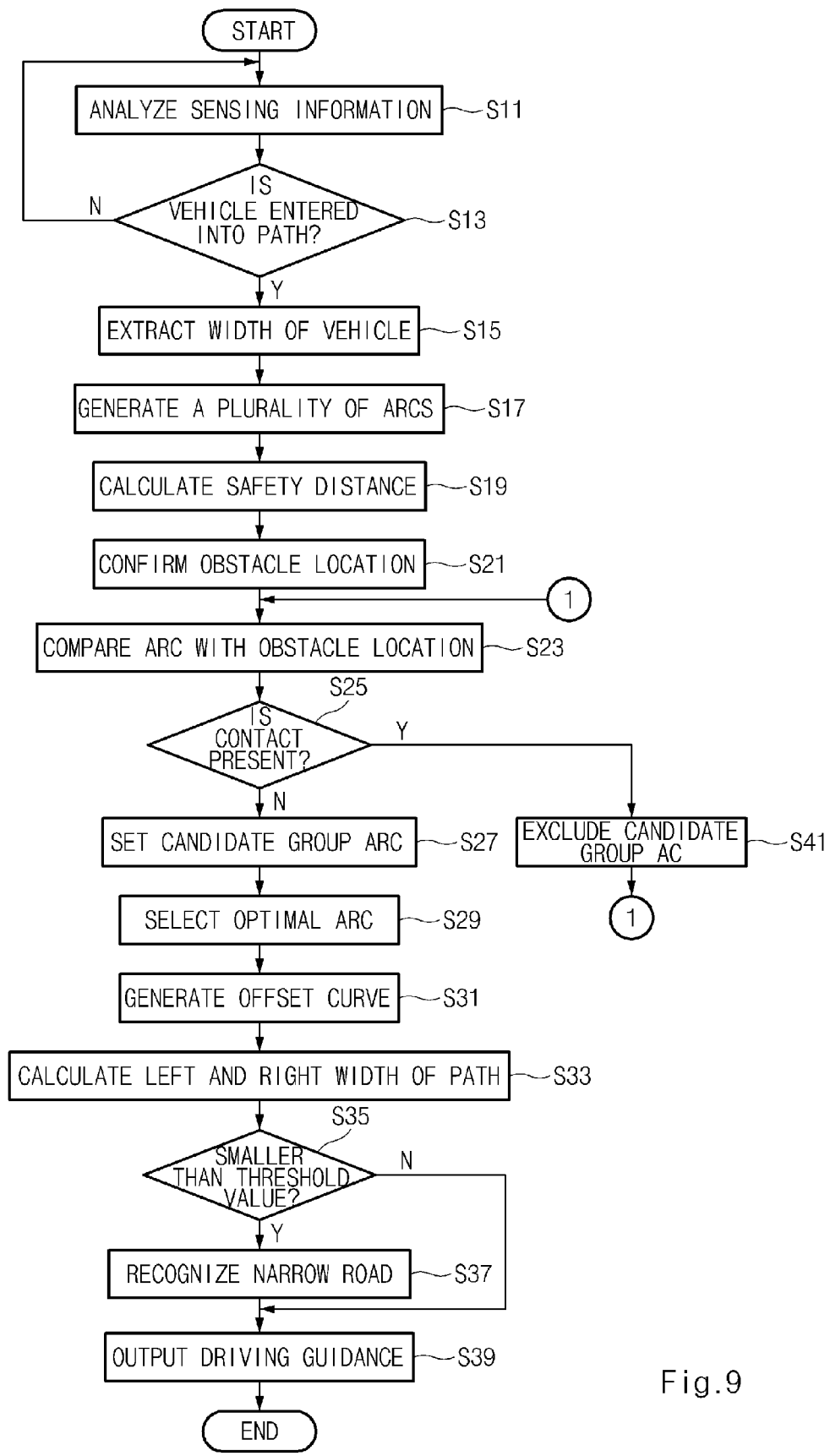
FIG. 9 is an exemplary flow chart illustrating a method for controlling driving of a vehicle according to the exemplary embodiment of the present invention.

FIG. 9 is an exemplary flow chart illustrating a method for controlling driving of a vehicle according to the exemplary embodiment of the present invention. Referring to FIG. 9, in S11, the controller 40 may be configured to analyze the sensing information received from the sensor unit 10 and in S13, the controller 40 may be configured to confirm whether the vehicle enters the path based on the analysis result. As the confirmation result in S13, when the vehicle enters the path, the controller 40 may proceed to S15 and when the vehicle does not enter the path, the control 40 may return to S11 to execute the step again. In S15, the controller 40 may be configured to extract the width of the vehicle which is previously stored in the storage unit 30.

Furthermore, in S17, the controller 40 may be configured to virtually generate the plurality of arcs and use the generated arcs to calculate the safety distance in S19. This is previously described using the above Equations 1 and 2 and therefore the detailed description thereof will be omitted.

The controller 40 may proceed to S21 to confirm the accurate location of obstacles which are located in the path. This is previously described using the above Equations 3 and 4 and therefore the detailed description thereof will be omitted. Further, the controller 40 may proceed to S23 to compare the plurality of arcs with the locations of obstacles and in S25, the controller 40 may be configured to confirm whether contacts are present at the plurality of arcs and the locations of obstacles as the comparison result. As the confirmation result in S25, when the contacts are not present at the plurality of arcs and the locations of obstacles, the controller 40 may proceed to S27 and when the contacts are present, the controller 40 may proceed to S41 to exclude the arcs at which contacts are present from the candidate group arcs and return to S23.

In S27, the controller 40 may be configured to set the arcs at which the contacts are not present as the candidate group arcs. In S29, the controller 40 may be configured to select the optimal arc from the candidate group arcs and proceed to S31. In S31, the controller 40 may be configured to generate the offset curve. The controller 40 may be configured to generate the offset curve using an arc that has a radius greater and less than that of the arc selected by setting a point such as the central point of the selected arc to a central point. Further, the controller 40 may be configured to generate the offset curve based on the extracted arc using the obstacle information.

In S33, the controller 40 may be configured to calculate the left and right width of the path based on the difference between the offset curves generated by the arcs greater and less than the selected arc and proceed to S35. The controller 40 may proceed to S37 when the left and right widths of the path are less than a threshold value and proceed to S39 when the left and right widths of the path are equal to or greater than the threshold value. In S37, the controller 40 may be configured to recognize the path of which the left and right widths are less than the threshold value as a narrow path and proceed to S39 to operate the output unit 20 to output driving guidance to allow a vehicle to pass through the narrow road.

As set forth above, according to the exemplary embodiment of the present invention, the driver may recognize the straight or curved narrow road conditions and calculate the width of the front of the vehicle or the width of the narrow road into which the vehicle enters to allow the vehicle to safely pass through the narrow road, thereby reducing the burden of the driver when driving a vehicle on the narrow road and minimizing the accident rate on the narrow road.

Hereinbefore, the apparatus and the method for controlling driving of a vehicle according to the present invention have been described with reference to the exemplary embodiments. Exemplary embodiments of the present invention have been described in detail with reference to the accompanying drawings. Even though specific terms have been used in the exemplary embodiments of the present invention, these terms are only used as general means to easily describe technical contents of the present invention and help understanding of the present invention but do not limit the scope of the present invention. It is obvious to those skilled in the art to which the present invention pertains that various modifications may be made without departing from the scope of the present invention, in addition to the exemplary embodiments disclosed herein.

What is claimed is:

1. An apparatus for controlling driving of a vehicle, comprising:
   a sensor unit that has at least one sensor disposed at sides of a vehicle; and
   a controller configured to:
      use sensing information received from the sensor unit to confirm whether the vehicle enters a path;
      generate a plurality of arcs based on a rear wheel shaft of the vehicle depending on a current velocity of the vehicle when the vehicle enters the path;
      detect obstacles located on the path;
      calculate a left width and a right width of the path based on the obstacles;
      confirm whether the path is a narrow road; and
      output a driving guidance to the confirmed narrow road.

2. The apparatus of claim 1, wherein the controller is configured to calculate a safety distance based on a current velocity and a deceleration of the vehicle and extract the arcs and arcs which do not contact the obstacles within the safety distance to set the arcs to candidate group arcs.

3. The apparatus of claim 2, wherein the controller is configured to generate offset arcs that have minimum and maximum radii contacting the obstacles based on the candidate group arcs.

4. The apparatus of claim 3, wherein the controller is configured to calculate a width of the path based on a difference between the offset arcs that have the minimum and maximum radii to confirm whether the path is the narrow road.

5. A method for controlling driving of a vehicle, comprising:
   analyzing, by a controller, sensing information measured by at least one sensor disposed at a side of a vehicle;
   confirming, by the controller, whether the vehicle enters a path based on the analysis result;
   measuring, by the controller, a current velocity of the vehicle when the vehicle enters the path;
   generating, by the controller, a plurality of arcs based on a rear wheel shaft of the vehicle depending on the current velocity of the vehicle;
   calculating, by the controller, a safety distance based on the current velocity and a deceleration;
   detecting, by the controller, obstacles located on the path;
   calculating, by the controller, a left width and a right width of the path based on the obstacles to confirm whether the path is the narrow road; and
   outputting, by the controller, a driving guidance to the confirmed narrow road.

6. The method of claim 5, further comprising:
   after detecting the obstacles, extracting, by the controller, the arcs and arcs which do not contact the obstacles to set the arcs to candidate group arcs within the safety distance; and
   generating, by the controller, offset arcs that have minimum and maximum radii contacting the obstacles based on the candidate group arcs.

7. The method of claim 6, wherein in confirming whether the path is the narrow road, a width of the path is calculated, by the controller, based on a difference between the offset arcs that have the minimum and maximum radii to confirm whether the path is the narrow road.

8. A non-transitory computer readable medium containing program instructions executed by a controller, the computer readable medium comprising:
   program instructions that use sensing information received from a sensor unit that has at least one sensor disposed at sides of a vehicle to confirm whether the vehicle enters a path;
   program instructions that generate a plurality of arcs based on a rear wheel shaft of the vehicle depending on a current velocity of the vehicle when the vehicle enters the path;
   program instructions that detect obstacles located on the path;
   program instructions that calculate a left width and a right width of the path based on the obstacles;
   program instructions that confirm whether the path is a narrow road; and
   program instructions that output a driving guidance to the confirmed narrow road.

9. The non-transitory computer readable medium of claim 8, further comprising:
   program instructions that calculate a safety distance based on a current velocity and a deceleration of the vehicle and extract the arcs and arcs which do not contact the obstacles within the safety distance to set the arcs to candidate group arcs.

10. The non-transitory computer readable medium of claim 9, further comprising:
    program instructions that generate offset arcs that have minimum and maximum radii contacting the obstacles based on the candidate group arcs.

11. The non-transitory computer readable medium of claim 10, further comprising:
    program instructions that calculate a width of the path based on a difference between the offset arcs that have the minimum and maximum radii to confirm whether the path is the narrow road.

* * * * *